United States Patent [19]

DeKay

[11] Patent Number: 4,817,327
[45] Date of Patent: Apr. 4, 1989

[54] HOOK KEEPER FISHING FLOAT

[76] Inventor: Thomas J. DeKay, 355 NE. Elm Ter., Pine Crest Lakes, Jensen Beach, Fla. 34957

[21] Appl. No.: 218,953
[22] Filed: Jul. 14, 1988
[51] Int. Cl.$^4$ .............................................. A01K 91/00
[52] U.S. Cl. ................................... 43/43.1; 43/44.95; 43/43.15
[58] Field of Search ................... 43/43.1, 43.11, 43.15, 43/44.87, 44.92, 44.95

[56] References Cited

U.S. PATENT DOCUMENTS

| | | | |
|---|---|---|---|
| 2,491,182 | 12/1949 | Jaske | 43/43.1 |
| 3,142,930 | 8/1964 | Lambach | 43/44.95 |
| 3,609,907 | 10/1971 | Wiig | 43/43.15 |

Primary Examiner—Kurt Rowan
Attorney, Agent, or Firm—Alvin S. Blum

[57] ABSTRACT

A fishing float can be snapped onto a fishing line to serve as a conventional fishing float. Alternatively it can be snapped onto the shank of a fish hook to protectively cover the point. A light weight float body has an axial bore. A spring-loaded plunger fits into one end of the bore. A wire shaft fits through plunger and bore. A hook portion at the end of the shaft is forced against the float body by the spring bias to engage either the fishing line or the shank of the fish hook. While the shank of the hook is thus engaged, a recess in the float body receives the sharp point of the hook.

10 Claims, 2 Drawing Sheets

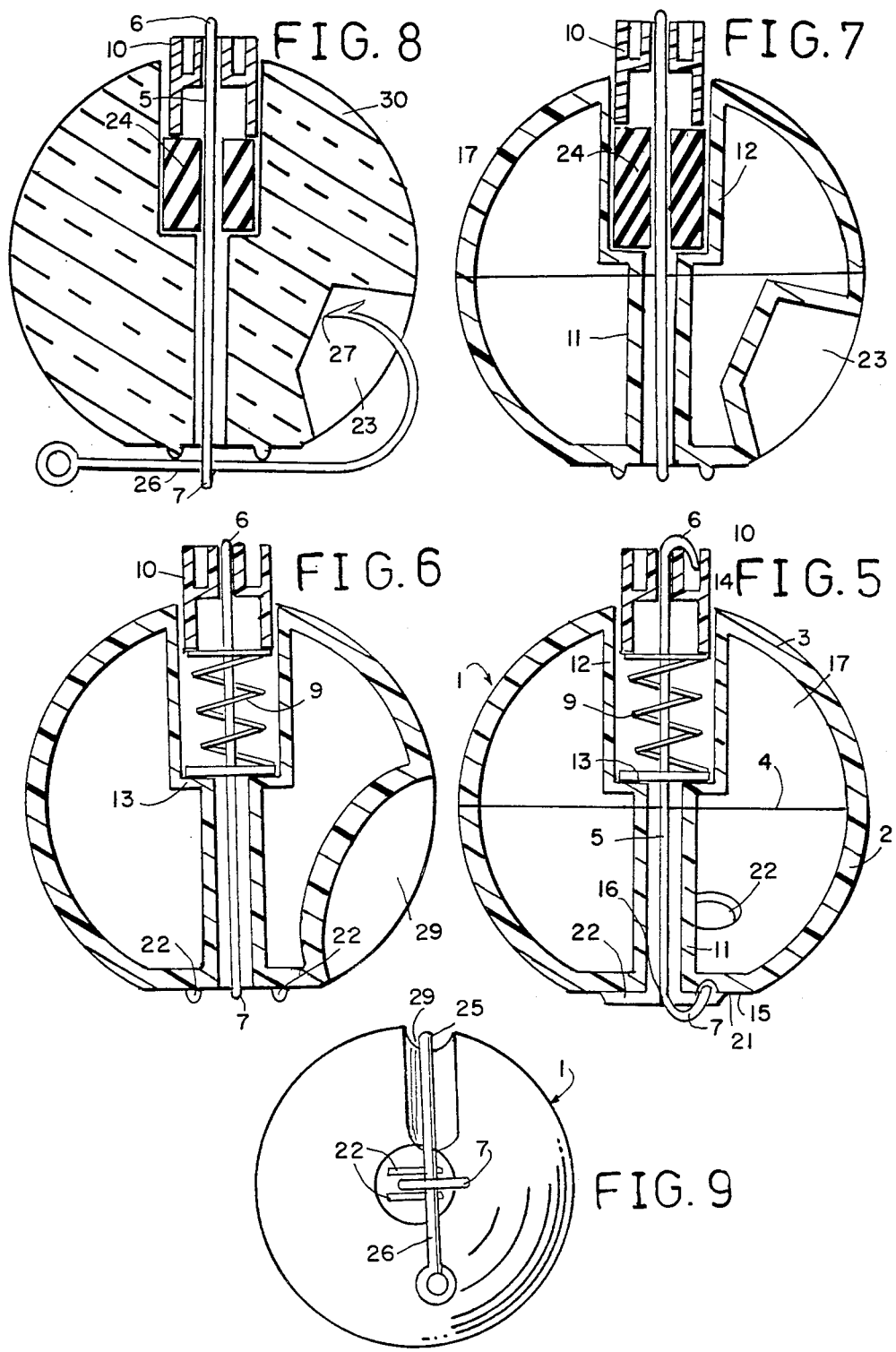

HOOK KEEPER FISHING FLOAT

BACKGROUND OF THE INVENTION

This invention relates to fishing floats and more particularly to fishing floats that incorporate means to engage a fish hook and cover its point to prevent injury and entanglement.

When a fishing rod is rigged for fishing, a hook is secured to the end of the line. When the hook is not in the water, such as when traveling by boat, car or walking, the hook may swing around dangerously and hook a person in the eye. Furthermore the hook may tangle in the line or in the lines of other rods or in passing trees and the like. If the hook point is covered, these problems are avoided. It is well known in the art to make fishing rods with a wire loop secured near the handle through which the hook may be passed to secure the hook. Another general practice is to engage one of the line guides with the hook. These methods may not hold the hooks securely. Another practice is to force the hook point into the handle when it is cork or other resilient material. But this tends to dull the point and damage the handle. It is common practice in many fishing tackle assemblies to employ a buoyant float that has a spring attaching means to readily affix it to the line.

SUMMARY OF THE INVENTION

It is accordingly an object of the invention to provide a fishing float that may be readily attached and removed from a fishing line for conventional fishing float use that can be removed from the line and affixed to the fishing hook in a fashion that protectively covers the point of the hook. The same springy engaging means that is used to engage the fishing line is used to engage the shank of the hook while a recess in the surface of the float receives the point of the hook.

The point of the hook is thereby sheathed to prevent it from accidentally injuring a person and also to prevent it from swinging free at the end of the fishing line and entangling fishing tackle, bushes, and the like. The hook will be generally so engaged while attached to the fishing line. To return to ordinary fishing configuration, the float is unsnapped from the hook and snapped onto the fishing line at the desired level.

BRIEF DESCRIPTION OF THE DRAWINGS

FIG. 5 is a cross section through 5—5 of FIG. 1.

FIG. 6 is a cross section through 6—6 of FIG. 3.

FIG. 7 is a cross section through 7—7 of FIG. 4.

FIG. 8 is a cross sectional as in FIG. 7 with a plastic foam construction and a hook protectively engaged.

FIG. 9 is a bottom view as in FIG. 3 with a hook protectively engaged.

DETAILED DESCRIPTION OF PREFERRED EMBODIMENTS

Figure 1:
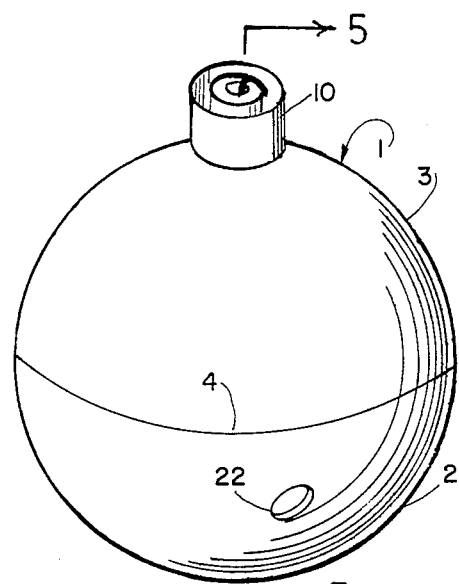
FIG. 1 is a perspective view of the float of the invention with the plunger uppermost.
Figure 2:
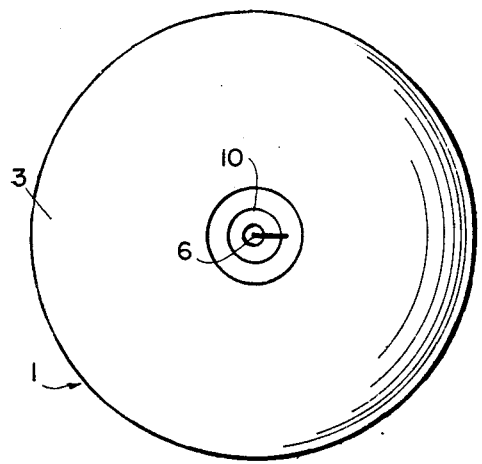
FIG. 2 is a plan view of the float.

Referring now to the drawings, there is shown in FIGS. 1, 2, and 5 a fishing float 1 of generally spherical shape that has an upper half 3 joined to a lower half 2 at seam 4 to form an inner floatation chamber 17. A central bore 16 passes through the float from top to bottom formed by a lower, small diameter sleeve portion 11 and an upper, large diameter sleeve portion 12. The junction of these two sleeve portions forms the spring seat 13, against which rests the compression spring 9. Atop spring 9 is plunger 10. A sturdy wire shaft 5 passes through plunger 10 and terminates in upper hook portion 6 seated in hook seat 14 and lower hook portion 7 seated in hook seat 15. The spring bias of spring 9, compressed between the base of plunger 10 and spring seat 13, pulls lower hook portion 7 tightly against bottom surface 21 of float 1. To engage a fishing line, the plunger 10 is depressed, compressing spring 9 further and causing wire shaft 5 to move downward, so that the lower hook portion 7 moves well below the bottom surface 21. The fishing line is placed on the lower hook 7 and the plunger 10 released. Spring bias forces lower hook 7 upward and presses the fishing line tightly against the bottom 21 of float 1. Elongate surface projections 22 can enhance the line gripping action of hook 7. Alternatively, lower hook 7 may be held in place when plunger 10 is depressed. Then upper hook 6 is exposed for snapping onto the fishing line. The fishing float 1 is easily removed by the reverse process. When the plunger is depressed the line is readily removed from hook 7 or hook 6.

Figure 4:
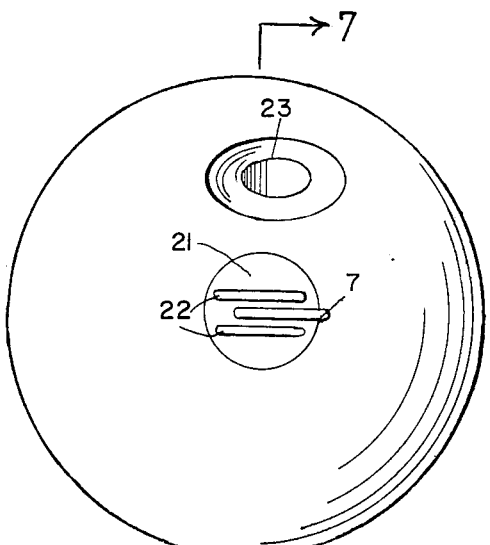
FIG. 4 is a bottom view of the float with a circular depression for engaging the hook.

This structure and function are well known in the prior art and are exemplified by U.S. Pat. No. 3,142,930 issued to Lambach on Aug. 4, 1964 for Fishing Float. The fishing float 1 of the invention has fish hook keeping means in addition to its fishing line engaging function. An aperture in the lower half 2 is located so as to receive the point of a fish hook when the shank of the fish hook is engaged by lower hook portion 7 of the wire shaft in much the same manner as the lower hook portion 7 engages the fishing line by forcing it tightly against the bottom surface 21 of float 1. In the alternative embodiment shown in FIGS. 4 and 7, a circular depression 23 is adapted to receive the point of the fish hook while the shank of the hook is held in the lower hook portion 7. Since this is a depression rather than an aperture in the wall of the float, it has the advantage of maintaining the air space 17 within the float water-tight. The spring bias is provided by an elastomeric sleeve 24 such as rubber or polyurethane for corrosion resistance.

Figure 3:
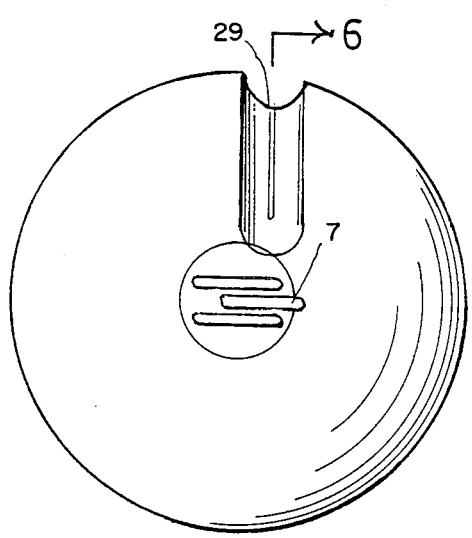
FIG. 3 is a bottom view of the float with a slot depression for engaging the hook.

In the embodiment shown in FIG. 8, the float is made from a light-weight solid material such as cork or foamed plastic. A fish hook 25 is engaged at its shank 26 by hook portion 7 of wire shaft 5. The sharp point 27 is held in the circular depression 23 where it cannot entangle or injure. In the alternate embodiment illustrated in FIGS. 3, 6 and 9 an elongate slot-like depression 29 is adapted for receiving the sharp point 27 of fish hook 25 while the shank 26 is held in hook portion 7 of wire shaft 5 by spring bias. The float may be formed by injection molding of the two hemispheres that are joined by well known joining means. Alternatively the sphere may be blow molded or formed from closed-cell foam plastic as in 30 of FIG. 9 or turned from cork or balsa wood or the like. Although a sphere is shown, the shape may take any of the common shapes for fishing floats such as egg or teardrop shapes.

The above disclosed invention has a number of particular features which should preferably be employed in combination although each is useful separately without departure from the scope of the invention. While I have shown and described the preferred embodiments of my invention, it will be understood that the invention may be embodied otherwise than as herein specifically illustrated or described, and that certain changes in the form and arrangement of parts and the specific manner of practicing the invention may be made within the underlying idea or principles of the invention within the scope of the appended claims.

What is claimed is:

1. A fishing float and fish hook keeper for alternative attachment to a fishing line and to a fish hook for protectively covering the point thereof while engaging the shank of said hook, comprising:

a lightweight float body having an axial bore extending therethrough with a portion of said bore providing a spring seat;

a spring biasing means having a first end and a second end, said biasing means mounted at said first end against said spring seat;

a plunger having an axial hole therethrough, said plunger extending into said bore and into engagement with said biasing means at said second end, said biasing means biasing said plunger outwardly of said bore;

a shaft extending axially of said bore and through said hole in said plunger, said shaft having first and second hooked end portions, said first hooked end portion being biased against the outermost end of said plunger by said biasing means for engaging said fishing line therebetween and said second hooked end portion being biased against said float body for engaging said fishing line therebetween in a first mode of operation and for engaging said shank of said fish hook therebetween in a second mode of operation;

a point-receiving recess in said float body for protectively receiving said point of said fish hook while said shank is engaged by said second hook portion.

2. The float and keeper according to claim 1 in which said point-receiving recess is an aperture in said float body.

3. The float and keeper according to claim 1 in which said point-receiving recess is a substantially circular depression in said float body.

4. The float and keeper according to claim 1 in which said point-receiving recess is an elongate slot shaped depression in said float body.

5. The float and keeper according to claim 1 in which said spring biasing means is a compression spring.

6. The float and keeper according to claim 1 in which said spring biasing means is an elastomeric cylinder.

7. The float and keeper according to claim 1 in which said float body is comprised of two halves sealably joined together.

8. The float and keeper according to claim 1 in which said float body is comprised of a closed-cell foam material.

9. The float and keeper according to claim 1 in which said float body is shaped from a single piece of light weight material.

10. The float and keeper according to claim 1 in which said float body is a one piece blow-molded structure.

* * * * *